United States Patent [19]

McRight

[11] 3,998,684
[45] Dec. 21, 1976

[54] METHOD OF MANUFACTURING AIR CUSHIONS

[76] Inventor: Kenneth L. McRight, 7456 S. Oswego, Tulsa, Okla. 74136

[22] Filed: Jan. 12, 1976

[21] Appl. No.: 648,523

[52] U.S. Cl. .............................. 156/253; 156/267; 156/291
[51] Int. Cl.² ..................... B32B 31/00; B32B 7/14
[58] Field of Search ........... 156/252, 253, 291, 267

[56] References Cited

UNITED STATES PATENTS

| | | | |
|---|---|---|---|
| 2,781,820 | 2/1957 | Rogers | 156/252 |
| 2,791,168 | 5/1957 | Mauch | 156/252 |
| 3,044,183 | 7/1962 | Mauch et al. | 156/252 |
| 3,072,520 | 1/1963 | Groth | 156/252 |

Primary Examiner—Douglas J. Drummond
Attorney, Agent, or Firm—Head, Johnson & Chafin

[57] ABSTRACT

A method of manufacturing an air cushion including the steps of cutting two pieces from an uncured rubber sheet, stacking the pieces, placing a stencil on the stacked pieces and punching two guide openings in the pieces, placing a stencil on each piece, the stencils having corresponding openings therein two of which are aligned with the guide holes in the pieces, applying adhesive around the periphery of the stencils and at the openings, placing the pieces together with the sides to which the adhesive has been applied in contact with each other, a paper stencil remaining between the two pieces, affixing an uncured rubber valve stem by adhesive, and curing the pieces with the valve stem attached to vulcanize the pieces to a single unit, the paper stencil preventing the pieces from adhering except for the openings in the stencil and the periphery whereby, after vulcanizing, air may be applied through the valve stem to expand the cushion.

6 Claims, 12 Drawing Figures

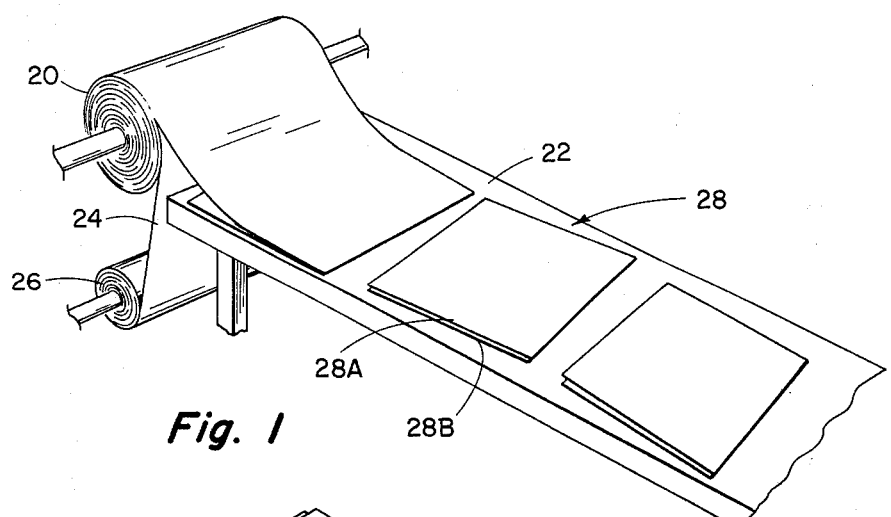
Fig. 1
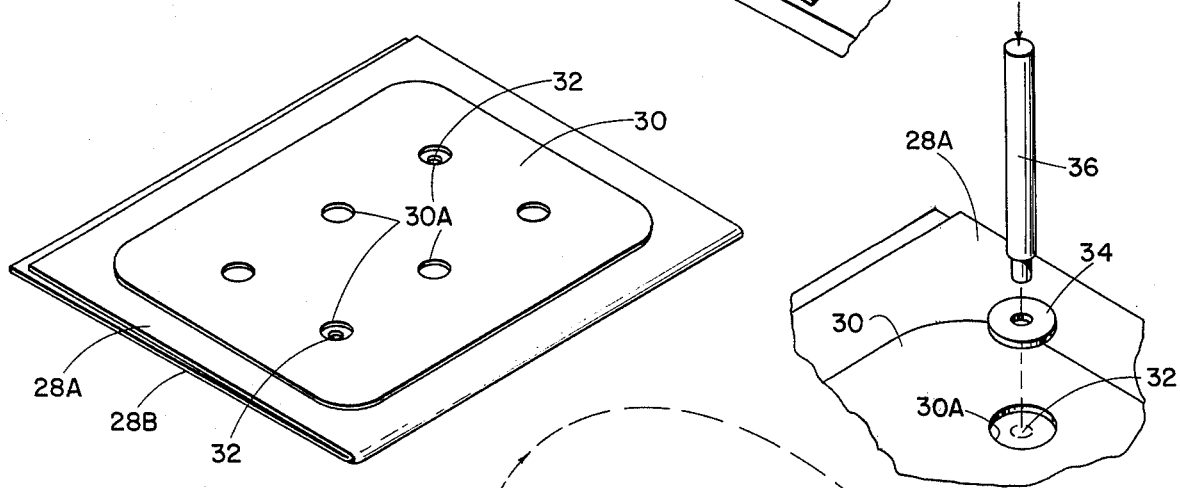
Fig. 2
Fig. 3
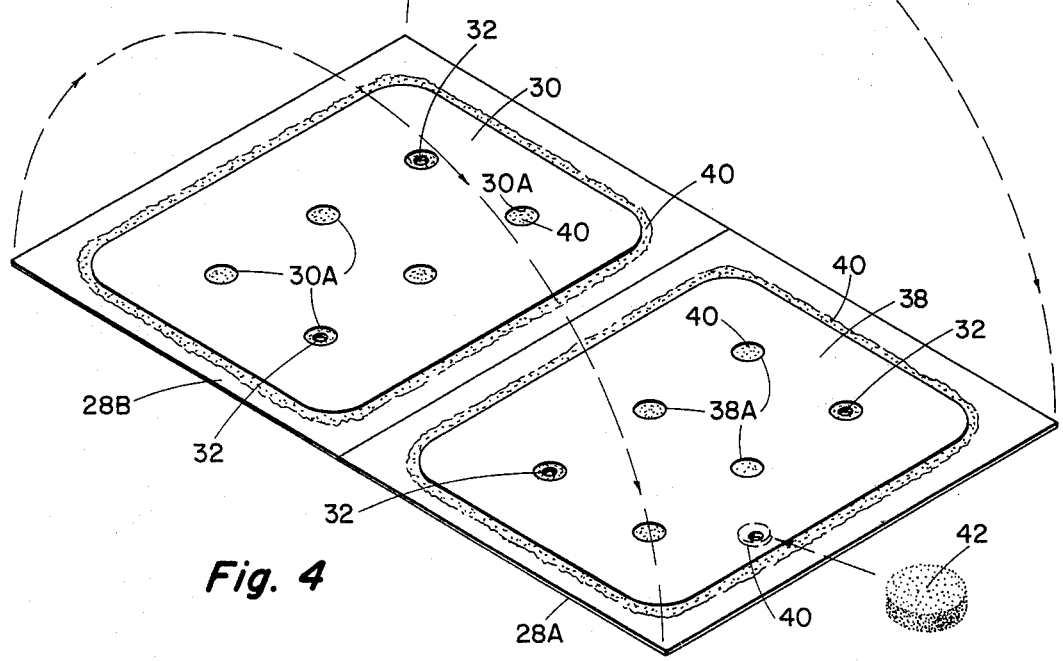
Fig. 4

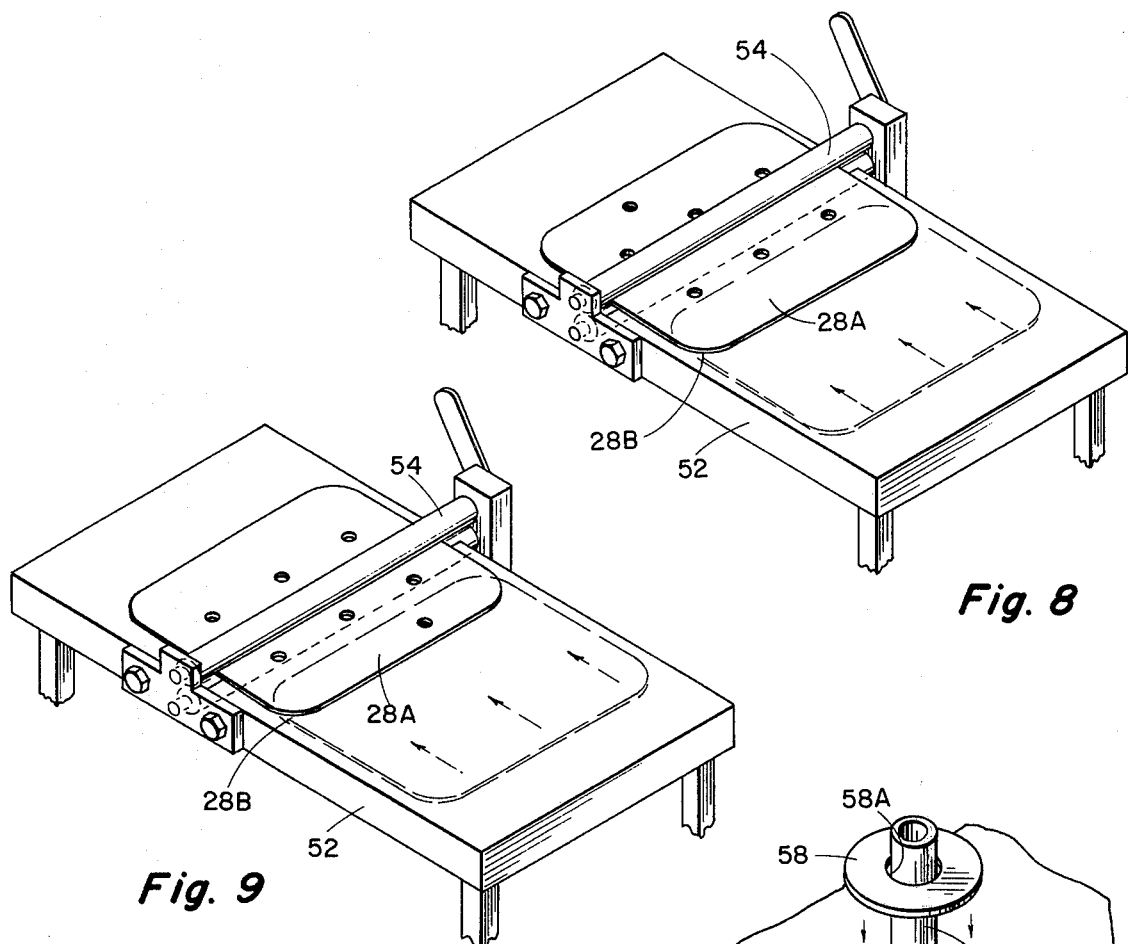
*Fig. 8*
*Fig. 9*
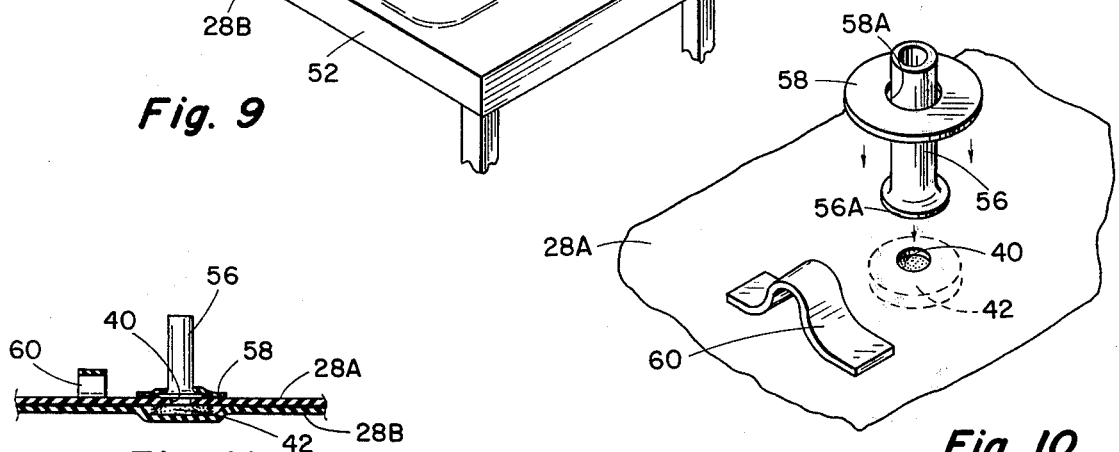
*Fig. 10*
*Fig. 11*
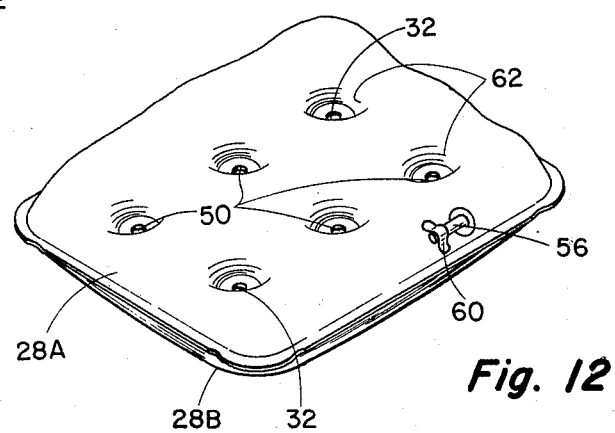
*Fig. 12*

METHOD OF MANUFACTURING AIR CUSHIONS

BACKGROUND AND OBJECTS OF THE INVENTION

This invention is directed towards a means of manufacturing an air cushion. While the invention is described and illustrated as it relates to a cushion, the principle may be applied to manufacture an air mattress or the like, the size of the manufactured object not being governed by the principles which will be described.

While the cushion manufactured according to the principles of this invention may have many applications, a specific and important application is for wheelchair users. One problem encountered by wheelchair users, which is common to anyone confined for prolonged periods to a bed or chair, is the development of sores, known technically as decubitus. The present invention provides a method of making a cushion which is particularly useful by wheelchair users and provides a cushion formed of soft pliable rubber and having good ventilation.

It is therefore an object of this invention to provide an improved means of manufacturing an air cushion.

More particularly, an object of this invention is to provide a method of manufacturing an air cushion from a sheet of uncured rubber in an arrangement wherein the air cushion, when completed, is ventilated by the provision of holes through the cushion.

These general objects as well as other and more specific objects of the invention will be fulfilled in the following description and claims, taken in conjunction with the attached drawings.

DESCRIPTION OF THE VIEWS

FIG. 1 is an isometric view showing pieces of unvulcanized rubber utilized in assembly of an air cushion according to this invention, the pieces being cut from a roll of uncured rubber sheeting.

FIG. 2 is an isometric view of a sheet of uncured rubber having been cut from a roll as in FIG. 1 and folded to provide two pieces hinged together and showing a stencil placed on the stacked pieces with holes punched in the pieces using two of the openings as guides.

FIG. 3 is a fragmentary isometric view showing details of the punch and washer arrangement utilized with the stencil shown in FIG. 2 for punching holes in the stacked pieces.

FIG. 4 is an isometric view of the pieces being unfolded and with a stencil placed on one piece and adhesive applied around the periphery and through the stencil openings and a paper stencil placed on the other piece with adhesive applied around the periphery and through the openings and showing a sponge disc insert positioned onto one of the pieces.

FIG. 8 is an isometric view of a rolling table by which the stacked pieces are rolled to be firmly pressed together, FIG. 8 showing the arrangement for rolling one half of the surface of the stacked pieces.

FIG. 9 shows the rolling table of FIG. 8 with the stacked pieces reversed and showing how the other half of the surface of the stacked pieces are rolled.

FIG. 10 is a fragmentary isometric view in exploded arrangement showing the positioning of the valve tube and valve loop onto the exterior of the stacked pieces, the valve tube and valve loop being positioned by adhesive.

FIG. 11 is a fragmentary cross-sectional view of the stacked pieces showing the valve tube in position, showing the valve loop and showing the sponge disc beneath the valve hole. After the completion of the steps generally illustrated in FIGS. 1 through 11 the assembled cushion is ready to be vulcanized by placing in an autoclave, such step not being illustrated.

FIG. 12 is an isometric view of an air cushion manufactured according to the steps of this invention, the air cushion having been filled with air and ready for use.

SUMMARY OF THE INVENTION

Figure 5:
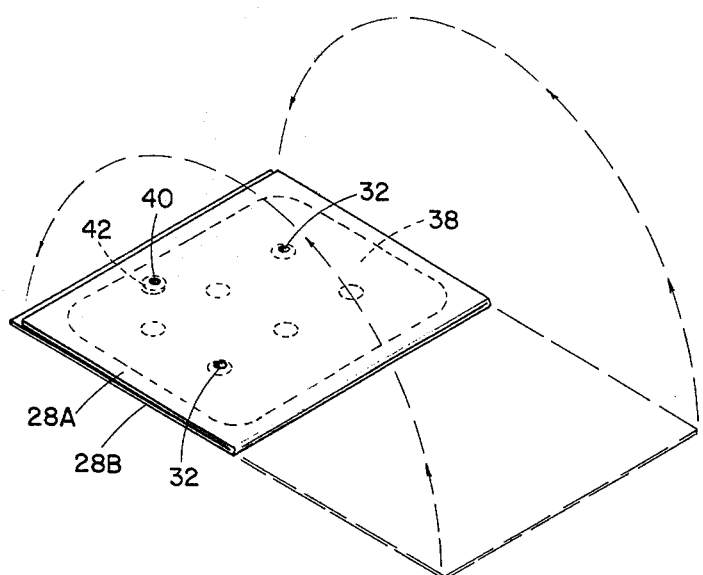
FIG. 5 is an isometric view showing the pieces being refolded so that they are again in stacked arrangement with the paper stencil and the sponge disc being retained therebetween.

A method is described for manufacturing an air cushion, particularly useful to combat decubitus of wheelchair users, the cushion being manufactured from sheets of uncured rubber. The pieces are stacked and then punched utilizing a stencil to provide orienting openings therein. Thereafter, the stencil is utilized to apply adhesive to one surface of one of the pieces and a paper stencil of the same dimension is utilized in applying adhesive to the other pieces. The pieces are then positioned together with the sides having the adhesive in engagement, the paper stencil being retained between the pieces. The pieces are then rolled to firmly contact them together. A valve tube and valve flap are then applied to one of the pieces and the cushion is then placed in an autoclave wherein the uncured rubber is vulcanized by heat and steam. After complete vulcanization the cushion is removed and a valve is inserted into the valve tube. The cushion is then complete and ready to be expanded by the application of air pressure.

DETAILED DESCRIPTION

Referring to the drawings and first to FIG. 1, a roll of uncured rubber 20 is shown adjacent a table 22. The roll of uncured rubber includes a paper apron 24 between the rolls so that the uncured rubber will not become bonded to itself, the paper apron being taken up on roll 26.

On table 22 uncured rubber from roll 22 is folded and cut into stacked pieces, the pipes being designated as 28A, and 28B. The folded pieces 28A and 28B have external dimensions greater than the length and width of the desired air cushion to be manufactured.

FIG. 2 shows the folded pieces 28A and 28B stacked one on top of the other. Placed on the stacked pieces is a stencil 30 having external dimension slightly less than the desired dimensions of the finished air cushion and having a plurality of openings 30A therein. Stencil 30 is centered on the stacked pieces 28A and 28B and two alignment holes 32 are punched using two of the openings 30A as guides. FIG. 3 shows a means of punching the alignment holes. An alignment washer 34 is positioned in an opening 30A in the stencil 30. A punch 36 is positioned in the washer 34 and then driven by a hammer to form the alignment openings 32, washer 34 serving to center opening 32 with stencil opening 30A. After the two alignment holes 32 are punched through both pieces 28A and 28B they are opened as shown in FIG. 4. Stencil 30 is then placed on the upper surface of piece 28B utilizing the alignment openings 32 as guides. At the same time, a paper stencil 38 having openings 38A therein is placed on the upper surface of sheet 28A. The paper stencil 38 is formed of thin flexible paper, such as news print and is of exactly the same dimension as stencil 30 and with the openings matching the stencil 30 openings. Since stencil 30 may be used repeatedly, it is preferably of thicker material such as cardboard, plastic or metal. Paper stencil 38 is positioned on piece 28A utilizing the alignment openings 32.

Adhesive 40 is then applied around the periphery of stencil 30 and through openings 30A. In like manner, adhesive 40 is supplied around the periphery of paper stencil 38 and through openings 38A. After the adhesive is applied stencil 30 is removed for subsequent reuse. Paper stencil 38 remains in position for purposes to be described later.

An additional step illustrated in FIG. 4 is that of punching a valve hole 40 in piece 28A. This may be punched by hand and the position is not critical but is preferably along one edge of the piece. The valve hole 40 is punched through the paper stencil 38 and through piece 28A. After punching the valve hole a plastic foam disc 42 is then secured over the hole 40, such as by the use of adhesive. The valve hole 40 may be of a diameter such as approximately ¼ inch. The foam disc 42 may be of a diameter of approximately 1 to 1 ½ inches and of approximately ⅛ to ¼ inch thickness.

After the adhesive has been applied as in FIG. 4, stencil 30 is removed, the valve hole 40 punched and the disc 42 positioned over the hole 40 by adhesive, pieces 28A and 28B are then folded back over each other as illustrated in FIG. 5, with the alignment holes 32 in register. Paper stencil 38 and disc 42 are now encompassed between pieces 28A and 28B.

Figure 6:
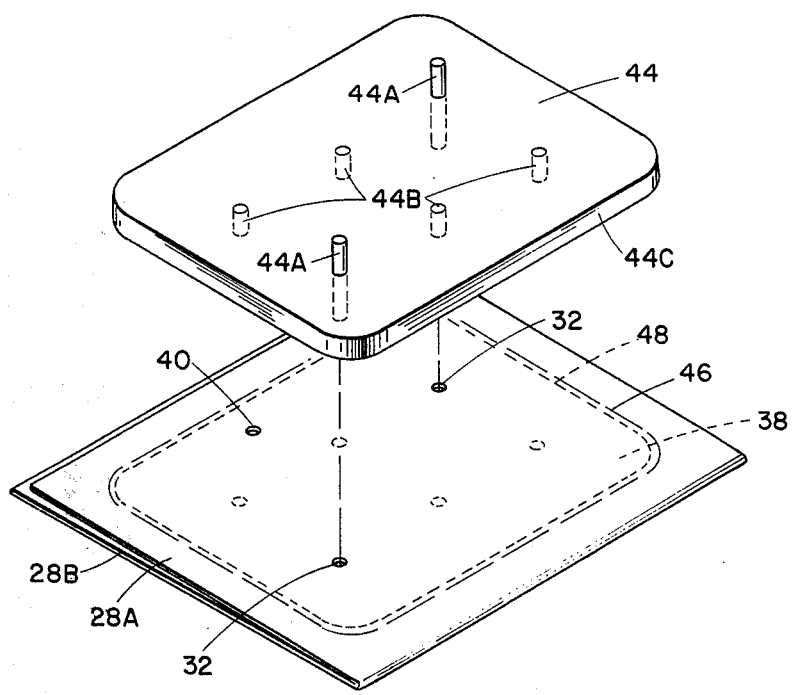
FIG. 6 is an isometric view showing the stacked pieces and a die positioned above the pieces as utilized in punching additional holes and trimming the outside edge of the pieces.

The next step is illustrated in FIG. 6. A die 44 is used to punch the balance of the ventilating holes required in the cushion and to trim the cushion to the desired external configuration. The die 44 has alignment guides 44A which extend to align in previously punched holes 32. In addition, die 40 includes punches 44B which form the balance of the desired ventilation hole in pieces 28A and 28A. Finally, die 44 includes a knife edge 44C which extends downwardly around the entire periphery of the die to trim off the excess material from pieces 28A and 28B. As shown in FIG. 6, line 46 is the outline which is cut by the cutting periphery 44C of die 44. The dotted line 48 represents the outside dimensions of paper stencil 38 retained between the pieces.

Figure 7:
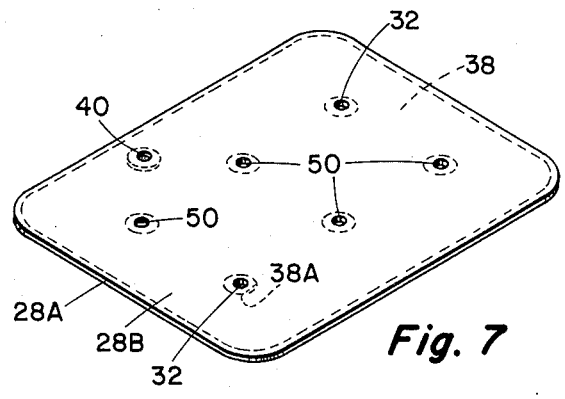
FIG. 7 shows the stacked pieces having been punched and trimmed by the die following the operation as illustrated in FIG. 6.

FIG. 7 shows the flat stacked pieces 28A and 28B having been trimmed by die 40 to the desired dimensions of the air cushion and having the additional ventilation openings 50 punched therein. The ventilation openings are in alignment with openings 38A in paper stencil 38 so that, after openings 32 and 50 are formed, an area of adhesive surrounds each of the openings.

The pieces having been punched and trimmed as in FIG. 7 are then placed on a rolling table 52 as shown in FIG. 8. By means of a roller 54 the pieces are pressed together to remove any air bubbles. In the preferred arrangement as illustrated in FIGS. 8 and 9, the stacked pieces with the paper stencil therebetween are preferably rolled one half at a time, FIG. 8 showing the stacked pieces being moved between the table and the roller 38 through approximately one half of the width of the pieces and FIG. 9 shows the pieces having been turned around and rolled through the other half. It has been learned that this process reduces the possibility of air bubbles being formed between the pieces.

The next step is the attachment of the air valve and air valve flap as shown in FIG. 10. The air valve tube 56 is a short length of tubular uncured rubber with a flange 56A integrally formed on one end. Adhesive is applied to the lower end of the valve flange 56A and it is positioned over valve opening 40, the foam disc 42 being below the opening 40. To further insure a strong engagement of the valve tube 56 with the outer surface of piece 28A a washer 58 of uncured rubber, having an opening 58A therein, is positioned down over the tube 48. Washer opening 58A is larger in diameter than tube 56 but smaller than flange 56A. Adhesive is applied to the lower surface of washer 58 so that as it is pushed down into engagement with the exterior surface of piece 28A the valve tube 56 is firmly adhered over the opening 40.

A valve flap 60 is formed of a short narrow length of uncured rubber. Adhesive is applied to one surface at each end. The valve flap is positioned on piece 28A adjacent valve opening 40 as illustrated in FIG. 10. The valve flap is looped so that when the manufacturing procedure is completed the valve tube 56 may be bent over and tucked under the valve flap as illustrated in the finished cushion of FIG. 12.

After the completion of the steps illustrated in FIGS. 1 through 10, the cushion is ready to be vulcanized. All parts of the cushion are formed of uncured rubber except the foam disc 42 and the paper stencil 38 which is positioned between the stacked pieces. The assembled product is placed in an autoclave wherein it is subjected to heat and steam until the uncured rubber material is vulcanized into a unitary device.

Prior to the curing step it is desirable to coat the external surfaces of pieces 28A and 29B, valve stem 38, washer 58 and valve flap 60 with a dust of zinc stearate. In addition, the cushion is preferably placed on a smooth layer of zinc stearate powder while it is supported on a tray in the vulcanizing autoclave. The use of the zinc stearate powder coating provides an improved texture and appearance to the completed product.

A finished cushion having been vulcanized and inflated is illustrated in FIG. 12. After vulcanization a metal valve (not shown) is inserted into the valve tube 56 to retain air in the cushion. The cushion may be inflated by mouth or by using a source of compressed air.

The pieces 28A and 28B are vulcanized to each other to become, in effect, integral components. Recessed areas 62 are formed in the inflated cushion by the portions which are vulcanized together as defined by the openings 38A in the paper stencil 38 (see FIG. 4) which conform to the openings 30A in stencil 30. In the center of each of these recessed areas is an opening 32 or 50. Openings 32 and 50 provide ventilation for the cushion.

While throughout the disclosure the stencils have been shown as providing six ventilation openings forming six recesses 62 in the finished cushion it can be seen that any number, fewer or greater may be employed. In addition, to provide a cushion for the comfort of victims of hemorrhoid and other diseases the cushion may be manufactured having different shaped recesses 62. This is accomplished merely by changing the shape and location of the openings in stencil 30 and paper stencil 38.

The invention has been described wherein the upper and lower pieces 28A and 28B are of a single sheet folded against each other. It can be seen that the same procedure is employed if the two pieces are separate and stacked and unstacked in the manufacturing procedure heretofore described. While the cushion has been illustrated as a means of employing the invention it can be seen that the dimensions of the product are not relevant to the principles of the invention and that the invention may be employed to manufacture air mattresses of any desired dimensions.

While the invention has been described as it relates to the manufacture of an air cushion it can be seen that the principles of the invention may be employed in the manufacture of other products, both plastic and rubber and whether inflated or noninflated.

While the invention has been described with a certain degree of particularity it is manifest that many changes may be made in the steps of the process without departing from the spirit and scope of this disclosure. It is understood that the invention is not limited to the embodiment set forth herein for purposes of exemplification, but is to be limited only by the scope of the attached claim or claims, including the full range of equivalency to which each step thereof is entitled.

What is claimed:
1. A method of manufacturing an air cushion comprising the steps of:
    1. cutting two pieces from an uncured rubber sheet, the dimension of the pieces being greater than the ultimate dimensions of the cushion;
    2. positioning the pieces one on top of the other;
    3. placing and centering a stencil board on top of the stacked pieces, the stencil having spaced openings therein;
    4. punching two openings in said pieces using said openings in said stencil as guides;
    5. separating the two pieces;
    6. placing said stencil board on the first piece using the openings therein as guides and applying adhesive to the sheet around the periphery of the stencil and through the openings therein, the stencil board thereafter being removed;
    7. placing a stencil paper on the other piece, the stencil paper being of the same dimensions with the same openings therein as said stencil board, the stencil paper being positioned by alignment with the openings in the sheet;
    8. applying adhesive to the second piece around the periphery of the stencil paper and through the openings in the stencil paper;
    9. punching a valve hole in the second piece;
    10. repositioning the second piece onto the first piece, the adhesive areas of each contacting the other and with the stencil paper being therebetween;
    11. punching additional holes in the stacked pieces, the punched holes being centered with the holes in the stencil paper;
    12. trimming the periphery of the stacked pieces, the trimmed periphery being exteriorly of the stencil paper;
    13. rolling the stacked pieces to firmly contact the two together;
    14. applying adhesive to the flanged base of a tubing valve and positioning the same over the valve hole in the second piece;
    15. vulcanizing the stacked pieces to bond the contacting portions together, the periphery and the openings in the paper stencil defining the areas which are bonded together; and
    16. inserting a valve core into the valve tube, the vulcanized pieces being then ready to receive and retain air therebetween to provide a vented cushion.

2. A method of manufacturing an air cushion according to claim 1 including:
    after step (a) placing a sponge disc over the valve hole, the sponge disc being positioned with the stencil paper between the stacked pieces by step 10.

3. A method of manufacturing an air cushion according to claim 1 wherein step 13 includes positioning the stacked pieces onto a table and moving a roller over them to firmly compress the pieces together.

4. A method of manufacturing an air cushion according to claim 1 wherein step 1 includes cutting a single rectangular piece having the longest dimension greater than twice one of the dimensions of the finished cushion, the long piece being folded to accomplish step 2, and unfolded to accomplish step 5.

5. A method of manufacturing an air cushion according to claim 1 including after step 14:
    applying adhesive to the ends of a retainer loop of uncured rubber and positioning the retainer loop second piece adjacent said tube valve.

6. A method of manufacturing an air cushion according to claim 1 including:
    applying zinc stearate powder to the exterior of said stacked pieces between step 13 and step 14.

* * * * *